US 11,300,771 B2

(12) United States Patent
Kalkbrenner et al.

(10) Patent No.: US 11,300,771 B2
(45) Date of Patent: *Apr. 12, 2022

(54) METHOD FOR OPERATING A MICROSCOPY ARRANGEMENT AND MICROSCOPY ARRANGEMENT HAVING A FIRST MICROSCOPE AND AT LEAST ONE FURTHER MICROSCOPE

(71) Applicant: Carl Zeiss Microscopy GmbH, Jena (DE)

(72) Inventors: Thomas Kalkbrenner, Jena (DE); Saskia Pergande, Jena (DE); Jörg Siebenmorgen, Jena (DE); Helmut Lippert, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/990,196

(22) Filed: Aug. 11, 2020

(65) Prior Publication Data

US 2020/0371336 A1 Nov. 26, 2020

Related U.S. Application Data

(63) Continuation of application No. 16/103,013, filed on Aug. 14, 2018, now Pat. No. 10,775,601.

(30) Foreign Application Priority Data

Aug. 15, 2017 (DE) ..................... 10 2017 214 189.1

(51) Int. Cl.
*G02B 21/26* (2006.01)
*G02B 21/18* (2006.01)
*G02B 21/36* (2006.01)

(52) U.S. Cl.
CPC ............. *G02B 21/26* (2013.01); *G02B 21/18* (2013.01); *G02B 21/365* (2013.01)

(58) Field of Classification Search
CPC ....... G02B 21/18; G02B 21/26; G02B 21/365
(Continued)

(56) References Cited

U.S. PATENT DOCUMENTS 10,775,601 B2 *  9/2020  Kalkbrenner ........ G02B 21/365
2015/0253560 A1 *  9/2015  Otte .................... G02B 21/0032
                                                           359/385

(Continued)

FOREIGN PATENT DOCUMENTS

WO    WO-2015071362 A1 *  5/2015  ........... G02B 21/367

*Primary Examiner* — Christopher S Kelley
*Assistant Examiner* — Kathleen M Walsh
(74) *Attorney, Agent, or Firm* — Duane Morris LLP

(57) ABSTRACT

A method for operating a microscopy arrangement, and a microscopy arrangement, having a first microscope and at least one further microscope, wherein each of the microscopes have a respective optical axis. The respective optical axes do not coincide. The method provides a three-dimensional reference coordinate system being set; a carrier apparatus, that is embodied in the arrangement to receive and hold a specimen carrier is introduced into a specimen plane of the first microscope that is intersected by the optical axis and onto the optical axis of the first microscope; a reference point is set on the optical axis of the first microscope; the carrier apparatus is delivered to the further microscope, wherein the current coordinates of the reference point are continuously captured and compared to the coordinates of the optical axis of the at least one further microscope; and the reference point is brought onto the optical axis of the at least one further microscope.

5 Claims, 4 Drawing Sheets

(58) Field of Classification Search
USPC .......................................................... 348/79
See application file for complete search history.

(56) References Cited

U.S. PATENT DOCUMENTS

2015/0317507 A1* 11/2015 Liebel ................... G02B 21/361
                                                                                       348/79
2017/0371140 A1* 12/2017 Cooper ................ G02B 21/367
2018/0356624 A1* 12/2018 Isobe ................... G01N 23/225

* cited by examiner

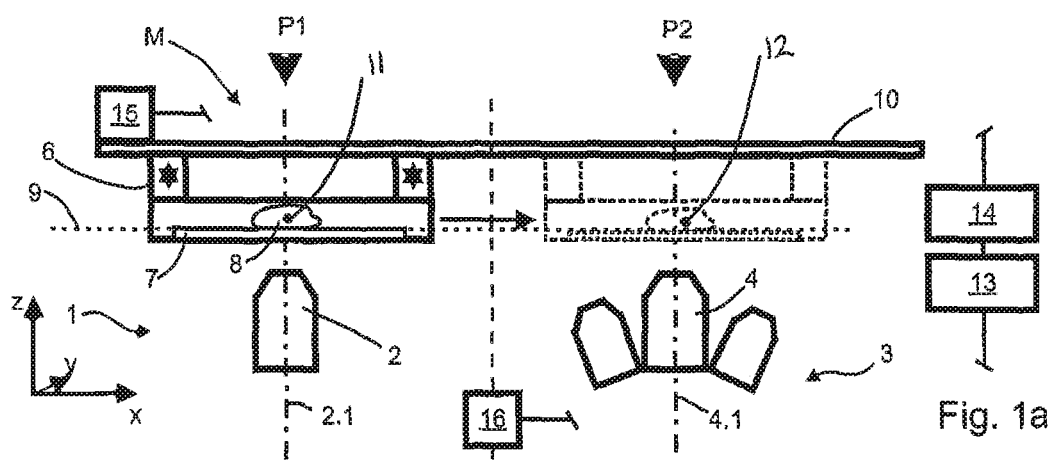
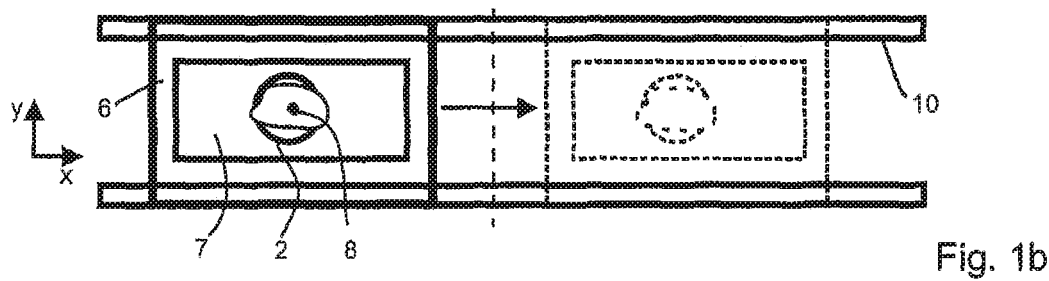
Fig. 1a
Fig. 1b

METHOD FOR OPERATING A MICROSCOPY ARRANGEMENT AND MICROSCOPY ARRANGEMENT HAVING A FIRST MICROSCOPE AND AT LEAST ONE FURTHER MICROSCOPE

RELATED APPLICATIONS

The present application is a continuation of parent application Ser. No. 16/103,013, filed in the United States on Apr. 14, 2018, which in turn claimed priority benefit of German Application No. DE 10 2017 214 189.1 filed in Germany on Aug. 15, 2017, the contents of which are incorporated by reference in their entirety.

FIELD OF THE INVENTION

The invention relates to a method for operating a microscopy arrangement having a first microscope and at least one further microscope, and to a microscopy arrangement.

When specimens to be examined are examined by means of different microscopes and/or different microscopy methods, finding (retrieving) a region of the specimen to be examined (region of interest, ROI) is problematic when transferring the specimen from one microscope to a further microscope.

In a workflow of the microscopic examination of a specimen that is denoted "conventional", said specimen is placed onto a suitable object carrier and set up in relation to an optical axis of the microscope. Subsequently, it is possible to record an overview image of the specimen with a low magnification and a large field of view (FoV), initially by means of an eyepiece if required, in order to identify specimen regions of interest (ROIs). Subsequently, the specimen can be examined using different examination methods, for example (fluorescence) contrast methods, DIC (differential interference contrast), polarization contrast, phase contrast, Hoffmann modulation contrast, dark field illumination, etc.

If different examination methods should be applied using only one microscope system, the latter must have an eyepiece beam path and at least one camera beam path. Further, e.g., a reflected light and transmitted light illumination, an objective interchange device, a filter interchange device, pupil engagement(s), for example for DIC (differential interference contrast) components, etc., are required.

A limb used for the microscope can facilitate an inverted or erect arrangement of the microscope. In order to permit the application of different examination methods, the limb requires further interfaces, for example for laser scanning microscopes (LSM), for total internal reflection fluorescence microscopy (TIRF microscopy), for fluorescence methods (e.g., fluorescence recovery after photobleaching; FRAP), a vivatome for the aperture correlation, a spinning disc, units for producing structured illumination, e.g., an apotome, etc., or combinations thereof. In these systems, the specimen remains substantially at the same position, and so the same specimen region can be examined using different objectives and/or methods. A disadvantage here is that many interfaces or many optical paths and switchover devices have to be kept available both on the illumination side and on the detection side in order to be able to operate all selection options (methods, modalities). Moreover, conventional limbs always have to have an objective interchange apparatus, for example an objective revolver, in order to be able to operate the different modalities (e.g., for a change between the provision of an overview image and an image with high resolution). Naturally, such an objective interchange apparatus is to the detriment of the stability of the optical system (so-called drift) in relation to an individual, fixedly assembled objective.

In contrast therewith are dedicated microscopy systems having specific objective arrangements, which are designed very specifically for one examination method, such as SPIM. By way of example, these do not permit an objective interchange. Even alternative contrast methods, such as DIC, polarization contrast, etc., are only possible to a very restricted extent using these objective arrangements.

Should one and same specimen be examined both using a dedicated examination method and, for example, using conventional microscopy, it is necessary to resort to a correlative approach, as is known from the combination of light and electron microscopy.

Here, the specimen is transported from the dedicated system to the conventional microscope, or vice versa, with the problem of retrieving the ROI in the specimen arising. This procedure is also referred to as "shuttle and find". This can be carried out either using very precisely manufactured specimen frames, which form the reference coordinate system, or by way of marked specimen vessels which, for example, have an enumerated grid, on the basis of which the desired position can be retrieved in the respective other microscope system. However, this procedure is time consuming and work intensive and does not ensure a quick and repeated interchange between modalities in a satisfactory manner.

BACKGROUND OF THE INVENTION

The prior art has disclosed microscopic arrangements which are embodied to examine a specimen with different examination methods.

DE 10 2012 014 768 B4 has described a microscope which has a first and a second imaging optical unit, which are arranged spaced apart from one another. They serve to image a first and a second object field into a first and second image field using a first illumination radiation. Further, a third imaging optical unit for imaging a third object field into a third image field using a second illumination radiation is present. Here, the first, the second and the third object field are arranged in an object plane, with the first and the second image field being arranged with overlap in an image plane. The wavelength of the first illumination radiation is longer than the wavelength of the second illumination radiation. The centres of the object field lie on a straight line and the first and second object field surround the third object field.

WO 2014/173547 relates to a microscopy method and an apparatus for multi-dimensional localization of objects of interest. Here, use is made of at least two reference marks of a reference coordinate system in order to establish a position of the relevant object in the reference coordinate system. This position thus established can be used by a second microscope in order to relocalize the object.

A press release from the Fraunhofer-Instituts für Optronik, Systemtechnik and Bildauswertung (press release dated 24 Jan. 2014) has disclosed a microscopy arrangement in which a number of different microscopes are operated by a robot. The robot has a central control unit and transfers a respective specimen with positional accuracy to the different microscopes.

OBJECT OF THE INVENTION

The invention is based on the object of proposing an alternative option for examining a specimen with different examination methods, wherein accurate relocalizing of specimen regions of interest is facilitated in the case of the change between the examination methods. At the same time, apparatus-type option should be proposed in order to ensure the high relocalization accuracy.

The object is achieved by a method having the features of claim 1 in respect of the option for accurate relocalization and according to claim 5 in respect of a microscopy arrangement. Advantageous developments are the subject matter of the dependent claims.

The method is designed for operating a microscopy arrangement having a first microscope and at least one further microscope, wherein each of the microscopes has an optical axis and the optical axes do not coincide.

The method according to the invention comprises steps A to F. Further intermediate steps can be carried out in further configurations of the method.

In a step A, a three-dimensional reference coordinate system is set, in which the coordinates of the extent of the optical axis of the first microscope and the coordinates of the extent of the further optical axis of the further microscope are known or established. The known or established coordinates are stored and serve as reference axes. By way of example, the reference coordinate system is set by virtue of the optical axis of the first microscope coinciding with one of the axes of the reference coordinate system and the point at which the optical axis intersects a front lens of an objective of the first microscope, for example, being set as a defined point of the reference coordinate system, for example the zero point or origin.

If the microscopy arrangement has exactly two microscopes, the further microscope is the second present microscope. By contrast, if more than two microscopes are present, the further microscope is a microscope to be used next. This need not necessarily be the microscope lying closest to the first microscope in space.

The coordinates of the extent of one of the optical axes can be captured and stored in a manner known per se to a person skilled in the art. By way of example, the coordinates of the extent are expressed as a vector (point and direction).

The first optical axis is given by the first objective when the latter is situated in the working position in the first microscope, and so image data of a specimen are captured or capturable by means of the first objective. Accordingly, the second optical axis is given by the further objective, situated in the working position, of the further microscope.

In a step B, a carrier apparatus that is embodied to receive and hold a specimen carrier is introduced into a specimen plane of the first microscope that is intersected by the first optical axis and onto the optical axis of the first microscope.

In order to carry out the method, an object to be imaged, for example a specimen, is preferably arranged in or on the specimen carrier.

The specimen plane is an intrinsic feature of the respective microscope or the currently used objectives and is preferably given by a respective focal plane of the microscope.

Step C includes setting a reference point that coincides with the optical axis and establishing coordinates of the set reference point.

In a step D, the carrier apparatus is delivered to the further microscope, wherein the current coordinates of the reference point are captured continuously and compared to the coordinates of the optical axis of the further microscope.

Depending on the differences established by means of the comparison between the current coordinates of the reference point and the coordinates of the optical axis of the further microscope, control commands are generated in a step E, by means of which control commands the further delivery movement of the carrier apparatus is controlled in a step F such that the carrier apparatus is positioned in such a way that the reference point coincide with the further optical axis.

The core concept of the invention consists of continuously capturing the coordinates of the carrier apparatus—and optionally the coordinate of a specimen therewith. This ensures that the specimen never leaves the reference coordinate system and that each region of the specimen can be retrieved and targeted without special markings and/or approaches within the meaning of a "shuttle and find" procedure.

A continuous capture of coordinates is provided if the coordinates are captured at very short intervals, in particular several times per second. By way of example, capture is carried out with a frequency of at least five, ten, twenty, fifty, one hundred or one thousand captures per second.

By way of example, the frequency of the continuous capture can be chosen and adapted depending on a displacement speed of the carrier apparatus. Thus, in the case of a low displacement speed, it is also possible to choose a low capture frequency—and vice versa.

A continuous capture can also be effected by counting movement units of the carrier apparatus, for example by virtue of direction-of-rotation-dependent rotations of actuators and/or direction-dependent steps of stepper motors being captured, evaluated and, where necessary, stored.

This concept is advantageous, in particular, for combining microscopy methods which require very specific optical or mechanical arrangements with more conventional methods. Thus, for example, the advantages of a fixed, and hence very stable, optical unit with a high flexibility in the choice of examination methods and simultaneous high accuracy of the relocalization are achieved.

Moreover, the time required for changing the specimen between various examination methods is only restricted by the path to be traveled and the displacement speed with which the carrier apparatus is moved. The time required for a change is therefore known in advance and standardizable, which serves in turn for an improved repeatability of experiment.

In an advantageous further configuration of the method, the coordinates of the reference point are compared in step D to setpoint coordinates of a target point to be targeted on the optical axis of the further microscope. Depending on the differences established by means of the comparison between the current coordinates of the reference point and the coordinates of the target point, control commands are generated in step E, and the further delivery movement of the carrier apparatus is controlled in step F by means of the control commands such that the carrier apparatus is positioned in such a way that the reference point coincides with the target point. As a result, the carrier apparatus and a specimen possibly situated thereon are also brought in a unique determined position relative to one another in a direction along the optical axis of the further microscope, which is usually referred to as z-direction.

In a further possible configuration of the method, image data of an object region are captured in step C and the reference point is set within the captured object region. The coordinates of the object region are known or are established and stored. Image data of a further object region are captured by means of the further microscope after step F, wherein the reference point lies in the further object region.

Optionally, the microscope used to capture the images is focussed along the optical axis before or during the capture of the image data.

The above configurations of the method can be combined with one another.

In respect of the apparatus-based design, the object is achieved by means of a microscopy arrangement comprising a first microscope and at least one further microscope, wherein each of the microscopes has an optical axis and the optical axes do not coincide. A carrier apparatus for receiving and for holding a specimen carrier is present. Moreover, a computer unit is present, which is embodied to set up a three-dimensional reference coordinate system, in which the coordinates of the extent of the optical axis of the first microscope and the coordinates of the extent of the further optical axis of the further microscope are known and stored or in which the coordinates of the extent of the optical axis of the first microscope established by means of measuring means present and the coordinates of the extent of the further optical axis of the further microscope are stored and serve as reference axes. A transporting apparatus is present for delivering the carrier apparatus to one of the optical axes. Coordinate measuring apparatuses are present, by means of which the current coordinates of the carrier apparatus are continuously captured or capturable. Moreover, the computer unit is furthermore embodied to compare current coordinates of the carrier apparatus captured by means of the coordinate measuring apparatuses to coordinates of the optical axis of the further microscope, wherein the comparison is effected between coordinates of a reference point set on the optical axis of the first microscope and the coordinates of the optical axis of the further microscope. In order to produce control commands, a control unit is present, said control unit being embodied to produce control commands depending on the differences, established by means of the comparison, between the current coordinates of the reference point and the coordinates of the optical axis. Moreover, the control unit is embodied to control the delivery movement of the carrier apparatus depending on the control commands, and so the carrier apparatus is positioned in such a way that the reference point coincides with the further optical axis.

By way of example, the reference coordinate system can be configured virtually by virtue of a spatial point actually present being defined as a certain point of the reference coordinate system and serving as a reference for all effected movements (changes in coordinates) and position coordinates of technical elements and an optical axis. It is also possible that a currently present relative position of at least two technical elements, better, for defining spatial relationships, at least three technical elements, of the microscopy arrangement are used as reference coordinates of the reference coordinate system. The optical axes used as reference axes are determined after setting up the reference coordinate system and they then serve as essential reference variables, albeit not necessarily as only reference variables.

The continuous capture of the coordinates can be effected, for example, by capturing and evaluating the respectively realized delivery paths of employed drives, i.e., using a path measuring system in the actuation system, and/or the continuous capture of reference marks (tracking) of the carrier apparatus.

By way of example, the specimen carrier is a cover slip, a plate or a Petri dish. Advantageously, it consists of a material, such as glass or transparent plastic, which is transparent to an employed illumination radiation and/or detection radiation to be captured. The specimen carrier provides a specimen plane, in which a specimen to be examined is arranged or arrangeable. Preferably, the specimen plane extends horizontally, although it also can be provided in other spatial planes in further embodiments of the microscopy arrangement.

At least one microscope of the microscopy arrangement can have a plurality of objectives which can be pivoted or inserted into the respective optical axis by means of an objective interchange apparatus, for example by means of an objective revolver or a linear slider. The reduced stability is countered by increased flexibility in the possible magnifications and/or examination methods.

It is also possible for at least one of the microscopes of the microscopy arrangement to have a plurality of objectives which, together and at the same time, are directed into the specimen plane.

In a possible embodiment, the first microscope and/or the further microscope each have an illumination objective and a detection objective, the optical axes of which are perpendicular to one another and directed into the specimen plane. The illumination objective can be embodied to produce a light sheet that intersects the specimen plane.

In a further embodiment option, the microscopy arrangement according to the invention can have an inverted-type embodiment. Here, the optical axes are directed onto or into the specimen through an employed specimen carrier and/or through the carrier apparatus.

In further embodiments of the microscopy arrangement, the optical axes can in each case include an angle that differs from zero with the specimen plane and a normal of the specimen plane.

The aforementioned options can be combined with one another. By way of example, a microscope embodied for light sheet microscopy may be present. It can be embodied with an erect or inverted alignment.

In further embodiments of the microscopy arrangement, a working space with a working position can be present next to the at least two microscopes. A working axis can extend through the working position. The coordinates of the working position and, optionally, the coordinates of the working axis are known within the reference coordinate system. The carrier apparatus can be delivered to the working position or to the working axis in accordance with the method according to the invention.

By way of example, the working space may, additionally or exclusively, serve for a non-optical examination or processing of the specimen and, for example, it may be embodied and set up as a filling station for filling specimen vessels by means of a pipetting machine or for changing buffer solution.

BRIEF DESCRIPTION OF THE DRAWINGS

The invention is explained in more detail below on the basis of exemplary embodiments and figures. In the figures:

FIG. 1a is a schematic illustration of a first exemplary embodiment of a microscopy arrangement according to the invention in a lateral view;

FIG. 1b is a schematic illustration of the first exemplary embodiment of a microscopy arrangement according to the invention in a plan view;

DESCRIPTION OF THE EMBODIMENTS

Figure 2:
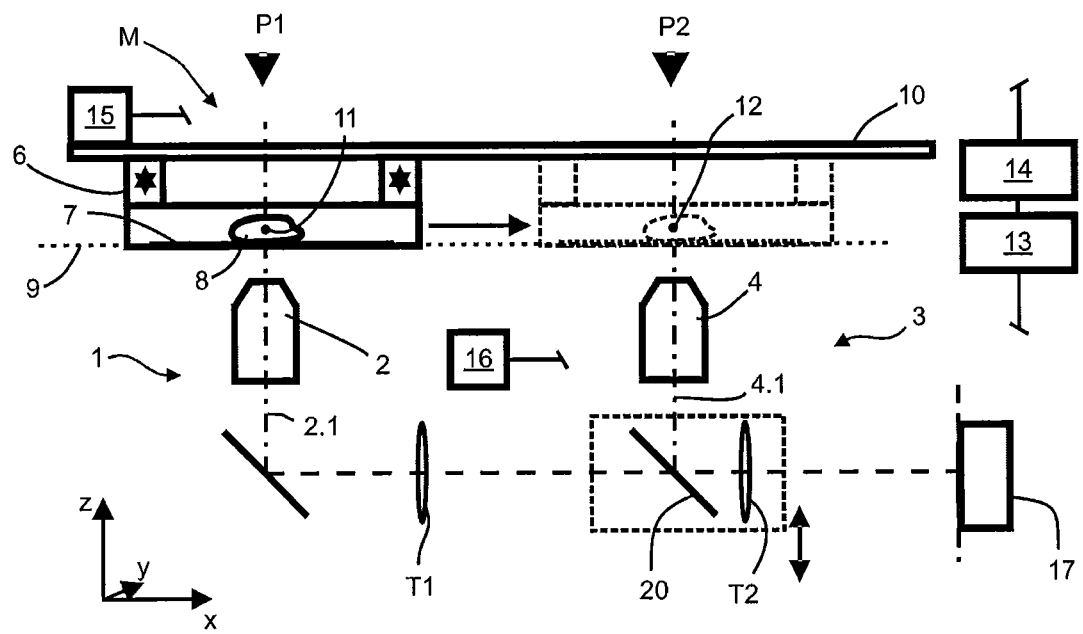
FIG. 2 is a schematic illustration of a second exemplary embodiment of a microscopy arrangement according to the invention.

The exemplary embodiments of a microscopy arrangement M are illustrated below in a schematic and exemplary manner in inverted-type embodiments. Present as essential elements of the microscopy arrangement M are a first microscope 1 having a first objective 2 and a first optical axis 2.1, and a further microscope 3 having a further objective 4 and a second optical axis 4.1, wherein the optical axes 2.1 and 4.1 extend parallel to one another and do not coincide (FIG. 1a).

A carrier apparatus 6 is present in FIG. 1a, a specimen carrier 7 being placed on said carrier apparatus. A specimen 8 to be examined is situated on the specimen carrier 7. A specimen plane 9, which extends horizontally in the exemplary embodiment and which is also used as a reference plane below, is provided by the upper side of the specimen carrier 7.

In further embodiments of the invention, the specimen plane 9 can be defined in a plane of the carrier apparatus 6 so as not to have to take account of possible unevenness of the specimen carrier 7.

The carrier apparatus 6 is situated at a first observing, examining or measuring position P1 (symbolized by an arrow; referred to below as measuring position), at which the specimen 8 lies on the first optical axis 2.1 and at which at least one image of the specimen 8 or of a region of the specimen 8 is captured or can be captured by means of the first objective 2 when carrying out an examination method.

Furthermore, a computing unit 13 is present, the latter being embodied to set up a three-dimensional reference coordinate system with the axes x, y and z. The coordinates of the extent of the first optical axis 2.1 of the first microscope 1 and the coordinates of the extent of the further optical axis 4.1 of the further microscope 3 are known and stored in the computing unit 13. In a further embodiment option, the extents of the optical axes 2.1 and 4.1 are established by means of measuring means present, in particular by means of at least one coordinate measuring apparatus 16, and the established coordinates of the extents of the optical axes 2.1 and 4.1 are stored. The extents of the optical axes 2.1 and 4.1 serve as reference axes.

Together with the specimen carrier 7 and the specimen 8, the carrier apparatus 6 is controllably displaceable by means of a transporting apparatus 10. To this end, the transporting apparatus 10 has at least one drive 15, which is actuatable by control commands of the control unit 14. The carrier apparatus 6 can be delivered to one of the optical axes 2.1 and 4.1 by means of the transporting apparatus 10. Here, the current coordinates of the carrier apparatus 6 are continuously captured or capturable by means of the coordinate measuring apparatus 16.

The computing unit 13, the control unit 14, the drive 15 or the drives 15 (see, e.g., FIG. 4) and also the at least one coordinate measuring apparatus 16 are linked to one another in a manner suitable for the interchange of data (indicated in the illustration).

The already mentioned computing unit 13 is further embodied to compare current coordinates of the carrier apparatus 6, captured by means of the coordinate measuring apparatus 16, to current coordinates of the optical axes 2.1, 4.1. In the illustrated case of displacing the carrier apparatus 6 from the first optical axis 2.1 to the second optical axis 4.1, a comparison of the captured current coordinates of the carrier apparatus 6 is effected with coordinates of the second optical axis 4.1.

In particular, the comparison is between coordinates of a reference point 11 set on the first optical axis 2.1 and the (position) coordinates of the second optical axis. Depending on the differences, established by means of the comparison, between the current coordinates of the reference point 11 and the coordinates of the second optical axis 4.1, control commands are produced in the control unit 14 and transmitted to the at least one drive 15 for controlling the delivery movement of the carrier apparatus 6, as a result of which the latter is actuated accordingly. Thus, the control is effected in such a way that the carrier apparatus 6 is positioned in such a way that the reference point 11 coincides with the second optical axis 4.1. Then, the carrier apparatus 6 is situated at a second measuring position P2 (shown in an exemplary manner with dashed lines and symbolized by an arrow).

The same process is illustrated in a simplified manner in a plan view in FIG. 1b.

The first exemplary embodiment shown in FIGS. 1a and 1b has a transporting apparatus 10, which is common to the first microscope 1 and the further microscope 3. The transporting apparatus 10 is embodied in an exemplary manner as a rail system.

The two microscopes 1, 3 can be housed in housings or housing parts that are different from one another (indicated by the dashed line between the two microscopes 1, 3). By way of example, this is advantageous if the microscopes 1 and 3 are intended to be operated at different ambient conditions.

FIGS. 1a and 1b elucidate a central concept and advantage of the microscopy arrangement M according to the invention. The two microscopes 1 and 3 share a common transporting apparatus 10. This allows both positioning the specimen 8 relative to the optical axis 2.1, 4.1 at the respective measuring position P1, P2 and transporting the specimen 8 between the measuring positions P1, P2. Consequently, the specimen 8 never leaves the reference coordinate system of its specimen holder 7. The three-dimensional positioning of the specimen 8, i.e., relative to the axes x, y and z, is facilitated by setting and continuously establishing the reference point 11, for example.

A few possible embodiments of the first microscope 1 and of the further microscope 3 are mentioned purely by way of example. By way of example, the first microscope 1 and/or the further microscope 3 is embodied as an inverted light sheet microscope, an erect light sheet microscope or as a microscope with a very high resolution and, for example, only one objective. A drift can be reduced or even avoided, especially in the latter embodiment. The first microscope 1 and/or the further microscope 3 also can be embodied to incubate the specimen 8, for example under predetermined temperature conditions or regimens, atmospheric conditions and/or illumination conditions or regimens. Furthermore, the first microscope 1 and/or the further microscope 3 can be embodied to capture an overview image and/or as a microscope with an objective interchange apparatus. Further, the first microscope 1 and/or the further microscope 3 can be embodied as a scanning microscope, in particular a laser scanning microscope (LSM), as a microscope with a manipulation unit for manipulating the specimen 8 by means of beams, by means of acoustic elements and/or by means of mechanical elements.

The measuring positions P1, P2 are preferably optically independent of one another and only linked by the common transporting apparatus 10. However, it is possible to partly superpose the illumination and/or detection beam paths by means of suitable optical elements and thus use light sources, assemblies, modules, detectors or cameras for both measuring positions P1, P2.

FIG. 2 shows a second exemplary embodiment of the microscopy arrangement M, in which elements of the microscopy arrangement M start to function for both illustrated measuring positions P1 and P2. In the exemplary embodiment, the detection beam paths of both microscopes 1 and 3 are superposed by means of a semi-transparent mirror as a beam unifier 20 and brought onto a common detector 17, for example a camera. Depending on the distance between the measuring positions P1, P2, this can be effected by two tube lenses T1, T2 with different focal lengths or by way of a relay optical unit (not shown). The beam unifier 20 and the tube lens T2 can be embodied as a group, which is symbolized by the edging with a dotted line. The relay optical unit (not plotted) can be introduced into the detection beam path, for example instead of the group made of tube lens T2 and beam unifier 20, if detection radiation coming from the measuring position P1 should be imaged on the detector 17.

Advantageously, the microscopy arrangement M facilitates a multiplicity of options for combining the available microscopes 1, 3, . . . , n. A light sheet microscope is present at the first measuring position P1 of the third exemplary embodiment of the microscopy arrangement M according to the invention, illustrated in FIG. 3. By means of an illumination objective BO, which is embodied to produce a light sheet 5 (shown as a bar in a simplified manner) along the illumination axis BO.1, the light sheet 5 is produced in the region in which the specimen 8 is situated or can be deposited. Here, the light sheet 5 can be produced dynamically by scanning a light beam in a plane, in this case in a plane at an angle of approximately 45° in relation to the specimen plane 9. In further embodiments, the light sheet 5 can be produced by means of an optical unit, for example a cylinder lens, which is arranged upstream of the illumination objective BO. In a simplified manner, the element 21 is presented as a representative for both options. A first objective 2 that is likewise present in the first microscope 1 serves as a detection objective. The optical axis of the illumination objective BO extends at an angle of approximately 45° in relation to the specimen plane 9. The first optical axis 2.1 provided by the first objective 2 likewise extends at an angle of approximately 45° in relation to the specimen plane 9 and it is perpendicular to the optical axis (illumination axis BO.1) of the illumination objective BO and it intersects the latter in the region of the produced light sheet LB.

The further microscope 3 has an objective interchange apparatus (shown by indicating the additional objectives). One of the objectives contained therein is in the working position on the second optical axis 4.1 and it represents the further objective 4.

Figure 3:
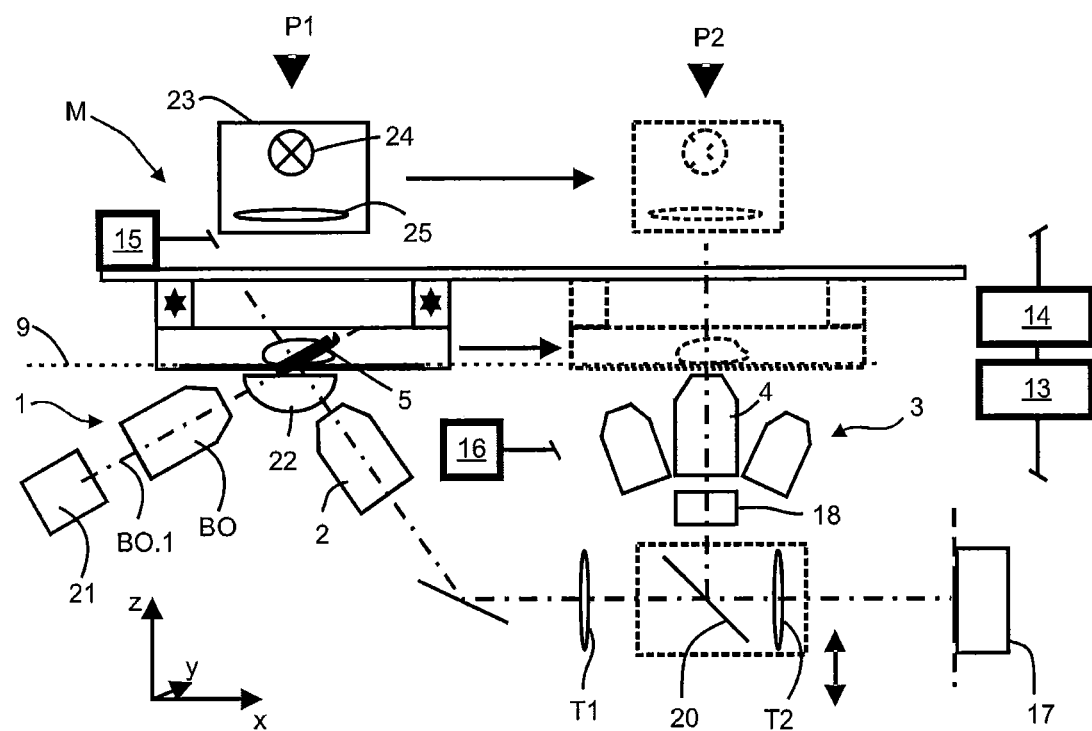
FIG. 3 is a schematic illustration of a third exemplary embodiment of a microscopy arrangement according to the invention and FIG. 4 is a schematic illustration of one exemplary embodiment of a microscope for light sheet microscopy.

In the exemplary embodiment shown in FIG. 3, a light sheet 5 is produced at the first measuring position P1 and the specimen 8 illuminated thus is observed by means of the first objective 2. Further, one or more correction elements 22, for example suitably embodied meniscus lenses, Alvarez plates and/or a relay optical unit, are provided for correcting the oblique passage through the specimen carrier 7. Alternatively, this microscope 1 can be operated with specific specimen vessels, which avoid the oblique passage.

In the illustrated exemplary embodiment, a dedicated microscope 1, which does not allow, or only allows to restricted extent, conventional microscopy method steps such as objective interchange, recording of an overview image, alternative contrasts (DIC, phase contrast, polarization contrast, etc.), is situated at the measuring position P1. These method steps are facilitated at the measuring position P2. To this end, the further objective 4 is in a conventional arrangement, i.e., the optical axis 4.1 extends perpendicular to the specimen carrier 7, at the measuring position P2. In this exemplary embodiment, a common detector 17 in the form of a camera is used for both measuring positions P1, P2. The detection beam paths are superposed on one another and the distances of the measuring positions P1, P2 are selected in such a way that the specimen planes 9 from measurement positions P1, P2 are imaged on a common image plane (dashed line) on the detector 17 by the tube lenses T1 and T2, which have different focal lengths.

If the specimen 8 to be examined is at the measuring position P1, the group formed by the beam unifier 20 and the tube lens T2 is removed from the beam path such that the detection beam path is directed from the first objective 2 to the detector 17 without passing through the group.

If the specimen 8 is examined at the second measuring position P2, the group formed by the beam unifier 20 and the tube lens T2 is introduced into the common beam path. The detection beam path of the objective 4 passes through said group and it is steered onto the detector 17.

In further embodiments, it is also possible to use filter devices for both beam paths together, said filter devices being able to be introduced into, or removed from, the respective beam paths in a manual or motor-driven manner, for example. For a common use of optical elements, it is possible to create an additional common infinite space.

The specimen 8 is moved between the measuring positions P1 and P2 by means of the common transporting apparatus 10. In further embodiments of the microscopy arrangement M, further measuring positions Pn (n=3, 4, . . . , n; not shown) may be present. In an advantageous configuration, the transporting apparatus 10 allows both the change in position in the x-direction and the fine positioning of the specimen 8 at the respective measuring positions P1, P2 in the x-, y- and z-direction. Hence, all positioning tasks at the measuring positions P1, P2, . . . , Pn can be carried out with a minimum of actuator degrees of freedom. This also includes focusing (z-direction), and so, for example, two dedicated measuring positions P1, P2 can be linked to one another by means of the solution according to the invention and it is possible to dispense with the z-drive, for example for focusing the objectives 2, 4 or an objective interchange device.

In the microscopy arrangement M illustrated schematically in FIG. 3, provision can be made of a transmitted light illumination unit 23 consisting of a light source 24 and a condenser 25, by means of which the specimen 8 is illuminated, or can be illuminated, from above. The illumination unit 23 either can be provided at both measuring positions P1, P2 or it is coupled to the transporting apparatus 10 and moved with the latter from measuring position P1 to measuring position P2, and vice versa. A fluorescence (reflected light) illumination can be coupled in at the measuring position P2 by way of a dichroic beam splitter 18.

Should, in further embodiments of the invention, no tube lenses T1, T2 with different focal lengths be used and/or the distances to be bridged between the common beam paths be too large, it is also possible to use an appropriately embodied relay optical unit.

Figure 4:
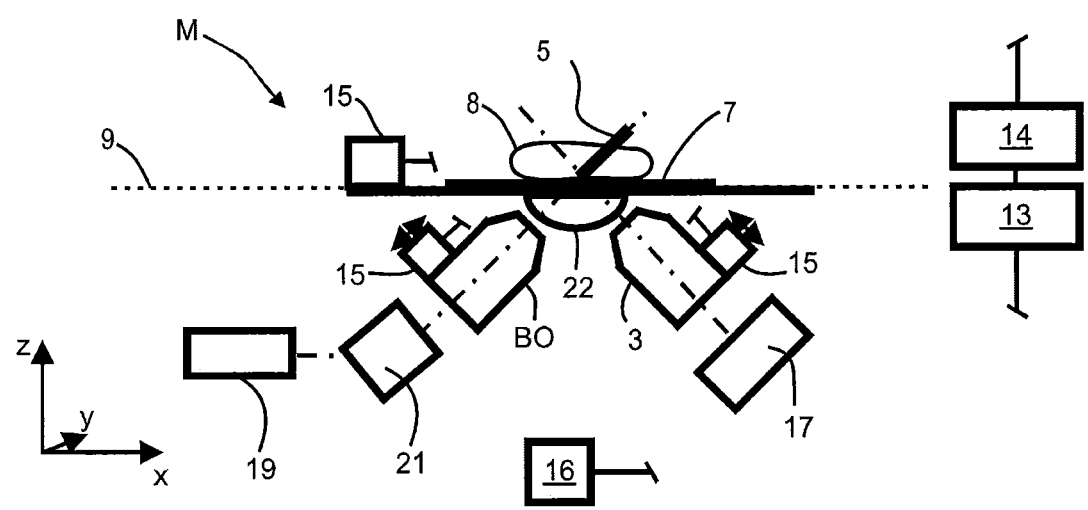

The set-up of a further example of a microscope for light sheet microscopy is illustrated schematically in FIG. 4. As explained in relation to FIG. 3, an illumination objective BO for producing the light sheet 5 and a first objective 2 are present. An illumination radiation is formed in a controlled manner by means of an AOTF 19 (acousto-optic filter) and deflected by means of a scanner 21. To this end, the AOTF 19 is connected to the control unit 14, which in turn is connected to the computing unit 13. The illumination radiation that was deflected by means of the AOTF 19 is formed into a light sheet 5 by means of the illumination objective BO, wherein the extent of the light sheet 5 is determined substantially, in particular in the direction of the y-axis, by the deflection of the scanner 21. Instead of an AOTF 19, use can also be made of, for example, spatial light modulators (SLM), micromirror arrays (digitalized micromirror device, DMD) or adaptive mirrors in further embodiments. By way of example, lasers and/or (laser) diodes can serve as a light source of the illumination radiation.

A so-called relay optical unit is arranged as a correction element 22 between the illumination objective BO, or the first objective 2, and the specimen carrier 7, aberrations that occur when illumination radiation or detection radiation passes through the specimen carrier 7 being reduced by the effect of said relay optical unit.

In a development of the aforementioned exemplary embodiments, the use of certain elements, for example the light sources of the illumination radiation, can be provided for a plurality of microscopes 1, 3 and corresponding beam paths and/or switching and selection options can be present.

Carrying out the method according to the invention for operating the microscopy arrangement M is described on the basis of FIG. 2. In a step A, the three-dimensional reference coordinate system is set as Cartesian coordinate system having axes x, y and z. Other reference coordinate systems, such as polar coordinate systems, cylindrical coordinate systems, also can be set in other configurations of the method. The coordinates of the extent of the optical axis 2.1 of the first microscope 2 and the coordinates of the extent of the further optical axis 4.1 of the further microscope 3 or of the optical axis of a microscope to be used next are known or are established and stored in a memory, for example in the computing unit 13. The optical axes 2.1, 4.1, . . . serve as reference axes.

In step B, the specimen carrier 7 with the specimen 8 is introduced onto the specimen plane 9 and the first optical axis 2.1. Thereupon, a reference point 11 that coincides with the first optical axis 2.1 is set and the coordinates of the reference point 11 are established in the reference coordinate system (step C). By way of example, the reference point 11 lies in a region to be examined (region of interest, ROI) of the specimen 8. Subsequently, the specimen 8 can be analysed using the first microscope 2 and the examination method or the examination methods for which the first microscope 2 is embodied. Once the analysis has been carried out, a signal is provided to the control unit 14 by the computing unit 13, whereupon the control unit 14 causes the generation of at least one control command and the transmission of the latter to the drive 15 of the transporting apparatus 10, as a result of which the drive 15 is actuated according to the control command obtained and the specimen holder 7 is transported with the specimen 8.

While the carrier apparatus 6 is delivered to the further microscope 3, the current coordinates of the reference point 11 are captured continuously and compared to the current coordinates of the optical axis 4.1 of the further microscope 3. To this end, use is made of the computing unit 13. Depending on the differences, established by means of the comparison, between the current coordinates of the reference point 11 and the coordinates of the optical axis 4.1 of the further microscope 3, control commands are generated by the control unit 14 after the computing unit 13 has transmitted appropriate information to the control unit 14. The generated control commands are transmitted to at least one of the drives 15 and a further delivery movement of the carrier apparatus corresponding to the respective control command is controlled. As a result of the continuous capture of the current coordinates and the comparison thereof with the current data of the reference axes, in particular the second optical axis 4.1 specified in the example, and the control commands generated thereupon, the carrier apparatus is positioned in such a way that the reference point 11 coincides with the further optical axis 4.1.

In a further configuration, the reference point 11 is brought into correspondence with a target point 12 on the second optical axis 4.1, as a result of which the specimen 8 is also positioned in the direction of the z-axis.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE SIGNS

M Microscopy arrangement
1 First microscope
2 First objective
2.1 First optical axis
3 Further microscope
4 Further objective
4.1 Second optical axis
5 Light sheet
6 Carrier apparatus
7 Specimen carrier
8 Specimen
9 Specimen plane
10 Transporting apparatus
11 Reference point
12 Target point
13 Computing unit
14 Control unit
15 Drive
16 Coordinate measuring apparatuses/sensor
17 Detector
18 Dichroic beam splitter
19 Acousto-optic filter
20 Beam unifier
21 Scanner/cylinder lens
22 Correction element
23 Illumination unit
24 Light source
25 Condenser
BO Illumination objective
BO.1 Illumination axis
T1 Tube lens
T2 Tube lens
P1 First measuring position
P2 Second measuring position

What is claimed is:

1. Microscopy arrangement comprising:
a first microscope and at least one further microscope, wherein each of said microscopes has an optical axis, said optical axis of said first microscope (hereinafter sometimes also referred to as the "first optical axis") and said optical axis of said at least one further microscope (hereinafter sometimes also referred to as the "further optical axis") do not coincide,
a carrier embodied in said arrangement to receive and hold a specimen carrier,
coordinate measuring apparatuses, by means of which current coordinates of the carrier apparatus are continuously captured or capturable,
a computer carried in said arrangement to set up a three-dimensional reference coordinate system, in which the coordinates of the extent of the optical axis of the first microscope and the coordinates of the extent of the optical axis of the at least one further microscope are known and stored or in which the coordinates of the extent of the optical axis of the first microscope established by means of at least one said coordinate measuring apparatus and the coordinates of the extent of the further optical axis of the at least one further microscope are stored and serve as reference axis,
a transporting apparatus, which is embodied in said arrangement to deliver the carrier apparatus to one of the said optical axes, while said transporting apparatus is embodied to transport the carrier from a first measuring nosition, where imaging using the first microscope is conducted, to a second measuring position, where imaging using a second microscope is conducted,
a common detector for receiving detection light from detection beam paths of the first microscope and the second microscope, while the detection beam paths of the first microscope and the second microscope are superposed on one another by means of a beam-unifier and brought along a common beam path onto a common image plane of said common detector,
said computer configured to compare current coordinates of the carrier apparatus captured by means of the coordinate measuring apparatuses to coordinates of the optical axis of the at least one further microscope, wherein the comparison is effected between coordinates of a reference point set on the optical axis of the first microscope and the coordinates of the optical axis of the at least one further microscope,
a controller for producing control commands depending on the differences, established by means of the comparison, between the current coordinates of the reference point and the coordinates of the further optical axis and for controlling the delivery movement of the carrier depending on the control commands such that the carrier apparatus is positioned in such a way that the reference point coincides with the further optical axis.

2. Microscopy arrangement according to claim 1, wherein said first microscope and/or the at least one further microscope have an illumination objective and a detection objective, the respective optical axes of which are perpendicular to one another and directed into a specimen plane, in which a specimen is arranged or arrangeable, and include an angle that differs from zero with the specimen plane and a normal of the specimen plane,
the illumination objective being configured to produce a light sheet that intersects the specimen plane.

3. Microscopy arrangement according to claim 2, wherein the illumination objective and the detection objective are arranged in inverted fashion such that the optical axes thereof are directed or directable through a specimen carrier onto the specimen plane.

4. Microscopy arrangement according to claim 1, wherein specimen planes from said first and second measurement positions are imaged on the common image plane on the common detector by either a first tube lens or a relay optical unit if the detection beam from the image plane of the first measurement position is to be detected; or by a second tube lens in the common beam path if the detection beam from the image plane of the second measurement position is to be detected; whereas first tube lens and second tube lens have different focal lengths.

5. Microscopy arrangement according to claim 1, wherein said beam-and the second tube lens form a group, which can be introduced into the common beam path or removed from the common beam path, respectively.

* * * * *

UNITED STATES PATENT AND TRADEMARK OFFICE
CERTIFICATE OF CORRECTION

PATENT NO. : 11,300,771 B2
APPLICATION NO. : 16/990196
DATED : April 12, 2022
INVENTOR(S) : Thomas Kalkbrenner et al.

It is certified that error appears in the above-identified patent and that said Letters Patent is hereby corrected as shown below:

In the Specification

Column 2, Line 57    now reads: "Optronik, Systemtechnik and Bildauswertung (press release"
should read -- Optronik, Systemtechnik und Bildauswertung (press release --

In the Claims

Column 13, Line 30    now reads: "suring nosition, where imaging using the first micro-"
should read -- suring position, where imaging using the first micro- --

Signed and Sealed this
Twenty-first Day of June, 2022

Katherine Kelly Vidal
*Director of the United States Patent and Trademark Office*